United States Patent
Dishman et al.

(10) Patent No.: US 6,222,658 B1
(45) Date of Patent: Apr. 24, 2001

(54) METHOD AND APPARATUS FOR A FREE SPACE OPTICAL NON-PROCESSING SATELLITE TRANSPONDER

(75) Inventors: John F. Dishman, Palm Bay; Edward R. Beadle, Melbourne, both of FL (US)

(73) Assignee: Harris Corporation, Palm Bay, FL (US)

( * ) Notice: Subject to any disclaimer, the term of this patent is extended or adjusted under 35 U.S.C. 154(b) by 0 days.

(21) Appl. No.: 09/129,964

(22) Filed: Aug. 6, 1998

(51) Int. Cl.$^7$ .................................................. H04B 10/00
(52) U.S. Cl. .......................... 359/172; 359/191; 370/281; 455/12-1
(58) Field of Search ................................. 359/172, 191, 359/124; 370/281, 319; 455/12–1

(56) References Cited

U.S. PATENT DOCUMENTS

| | | | |
|---|---|---|---|
| 3,493,759 | 2/1970 | Adler | 359/311 |
| 3,689,841 | 9/1972 | Bello et al. | 375/216 |
| 4,025,783 * | 5/1977 | Fletcher et al. | 359/193 |
| 4,033,882 * | 7/1977 | Fletcher et al. | 359/191 |
| 4,074,234 | 2/1978 | Fox | 359/148 |
| 4,090,036 | 5/1978 | Stott et al. | 370/316 |
| 4,575,186 | 3/1986 | Gottlieb et al. | 359/308 |
| 4,579,421 | 4/1986 | Brown et al. | 359/259 |
| 4,628,493 | 12/1986 | Nelson et al. | 367/79 |
| 4,639,092 | 1/1987 | Gottlieb et al. | 359/308 |
| 4,671,620 | 6/1987 | Yao | 359/311 |
| 4,768,186 | 8/1988 | Bodell | 359/132 |
| 4,867,560 | 9/1989 | Kunitsugu | 356/139.05 |
| 4,960,322 | 10/1990 | Khoshnevisan et al. | 359/305 |
| 4,982,445 | 1/1991 | Grant et al. | 359/159 |
| 5,351,148 | 9/1994 | Maeda et al. | 359/124 |
| 5,410,421 | 4/1995 | Huignard et al. | 359/15 |
| 5,436,751 | 7/1995 | Ohya et al. | 359/182 |
| 5,450,223 | 9/1995 | Wagner et al. | 359/124 |
| 5,463,493 | 10/1995 | Shah | 359/312 |
| 5,610,748 | 3/1997 | Sakanaka et al. | 359/154 |
| 5,661,582 * | 8/1997 | Kintis et al. | 359/172 |
| 5,682,256 | 10/1997 | Motley et al. | 359/117 |
| 5,689,354 | 11/1997 | Orino | 359/172 |

* cited by examiner

*Primary Examiner*—Kinfe-Michael Negash
(74) *Attorney, Agent, or Firm*—Allen, Dyer, Doppelt, Milbrath & Gilchrist, P.A.

(57) ABSTRACT

A method and apparatus for a free space optical non-processing satellite transponder includes the step of receiving a phase modulated optical communication signal in a satellite. This phase modulated optical communication signal has been formed by phase modulating an optical carrier signal with a broad band frequency division multiplexed communication signal. The signal is passed through an optical heterodyne receiver to produce a broad band frequency division multiplexed communication signal. Part of the signal is split off for on-board satellite processing. The balance of the signal is combined within a power combiner with a radio frequency signal from an on-board source of the satellite to form a combined broad band frequency division multiplexed communication signal. An optical carrier signal is phase modulated with the broad band frequency division multiplexed signal by mixing the multiplexed signal with the optical carrier signal in an electro-optic modulator to produce a phase modulated optical communication signal. The phase modulated optical communication signal is then re-transmitted into free space.

43 Claims, 6 Drawing Sheets

METHOD AND APPARATUS FOR A FREE SPACE OPTICAL NON-PROCESSING SATELLITE TRANSPONDER

FIELD OF THE INVENTION

This invention is related to the field of optical communications, and more particularly, this invention is related to a method and apparatus of free space satellite communications using an optical carrier signal.

BACKGROUND OF THE INVENTION

U.S. patent application Ser. No. 09/076,494, filed May 12, 1998, and entitled, "SYSTEM AND METHOD FOR FREE SPACE OPTICAL COMMUNICATIONS," assigned to the present assignee by the same inventors, and hereby incorporated by reference in its entirety, describes a method by which next generation satellite communication systems could achieve extremely high data rates for direct intersatellite, satellite-to-ground, and ground-to-satellite communications over extremely large line-of-sight distances using optical technology. The application achieved a technological advance by circumventing various shortcomings, such as common with optical data communication technology that followed the development of terrestrial fiber optic networks and concentrated solely on the transmission of digital information, typically using a pulse-pulse modulation (PPN), on-off keying (OOK) format, or wavelength-division multiplexing (WDM) to increase the information rate in optical channels. Those techniques did not fully exploit the advantages of optical communication technology for high data rate space based applications.

The invention disclosed in the '494 application circumvented those shortcomings by electrically combining a number of data sources, digital or analog, using a frequency-division multiple access theme, and using this signal as a wide band modulating signal to alter the phase of a single optical carrier. The constant envelope of phase modulation was advantageous as compared to amplitude modulations (OOK), (PPM) for simplifying detection schemes as is well known in communications. At the receiving terminal, the carrier is coherently demodulated and the individual electrical signals recovered using filtering of amplification. The invention described in that application, unlike known prior art, allows digital and analog signals to simultaneously share a single optical carrier.

The invention of the '494 application allows both analog and digital data to be transmitted simultaneously on a phase modulated optical communication signal to a receiver, such as for intersatellite and satellite-to-ground communications. Because the optical carrier signal is phase modulated, the problems associated with moving targets and changes in distances between the targets, e.g., satellites and/or ground stations and satellites, are reduced. A constant envelope type of modulation, i.e., phase modulation, is used instead of the more conventional intensity modulation, which changes the amplitude of the signal. As a result, no auxiliary or pilot signal is necessary. Additionally, the phase modulated signal is readily adapted for non-mechanical steering, which decreases any payload weight for communications equipment, requires less fuel and decreases acquisition times.

Typically, a mixture of analog, digital or RF signals are each passed through a mixer where respective signals are up converted into a unique signal slot or channel. The frequencies then are combined to form the broad band frequency division multiplexed signal. A laser generates an optical carrier signal. An electro-optic modulator phase modulates the optical carrier signal with the multiplexed signal to produce a phase modulated optical communication signal.

A receiver is positioned, such as in a satellite, to receive the phase modulated optical communications signal. The receiver comprises a demodulator for demodulating the phase modulated optical communications signal back into the original broad band frequency division multiplexed signal. A demultiplexer (e.g., filter) allows demultiplexing of the broad band frequency division multiplexed signal into the plurality of communication signals comprising the frequency division multiplexed signal.

A plurality of digital communication signals are generated and analog modulated onto an optical carrier using an electro-optic technique. The electro-optic modulator can preferably comprise a Mach-Zender electro-optic modulator. An antenna can receive communication signals to be multiplexed with a receiver, such as in a satellite, and can be connected through the frequency division multiplexer for receiving analog communication signals generated by a remote source. The electro-optic modulator preferably generates an optical carrier signal wavelength of about 1,550 nm. This wavelength is preferable because erbium-doped fiber amplifiers can be used at this wavelength for amplifying the phase modulated optical communication signals.

However, a receiving satellite may be positioned behind the horizon or otherwise, improperly positioned, and thus, a transmitting satellite would not be able to transmit the signal adequately. It is therefore essential that some type of repeating station be considered for the two satellites. Additionally, because both analog and digital data, as well as various different data, are transmitted on the signal, it may be desirable to pull off part of the signal, and then transmit the balance of the signal to a receiving satellite. This intermediate satellite that would pull off part of the signal and then transmit the balance or remainder of the signal acts as an optical non-processing transponder, which would not demodulate the signal for pertinent data and information, but only retransmits the signal after amplifying, such as similar to a normal RF non-processing satellite transponder repeater.

SUMMARY OF THE INVENTION

It is therefore an object of the present invention to provide a method and system for free space optical communications that allows repeating of an optical signal, and also a portion of the signal to be split off for on-board satellite processing.

In accordance with the present invention, a method and system of free space satellite communications now allows not only a signal to be repeated, but also allows a part of a communication signal to be split off for on-board satellite processing. Additionally, the balance of the signal can be combined in a power combiner with a radio frequency signal from an on-board source to form a combined broad band frequency division multiplexed communication signal. Part of the signal that is split off from the communication signal could be used, such as with another radio frequency transmitter, an optical transponder, or an on-board processor. Additionally, some signals could be obtained from on-board sources on the satellite, such as an on-site telescope that was receiving video data, which could be combined with a video source and transmitted to the next satellite.

In accordance with the present invention, a method aspect allows free space satellite communications and comprises the steps of receiving a phase modulated optical communication signal within a satellite. This phase modulated optical communications signal has been formed by phase modulating an optical carrier signal with a broad band frequency division multiplexed communication signal. This signal is passed through an optical heterodyne receiver to produce a broad band frequency division multiplexed RF signal. A part of the signal is split off for on-board satellite processing. The balance of the signal is combined in a power combiner with a radio frequency signal from an on-board source of the satellite to form a combined broad band frequency division multiplexed communication signal. An optical carrier signal is phase modulated with a broad band frequency division multiplexed signal by mixing the multiplexed signal with the optical carrier signal and electro-optic modulator to produce a phase modulated optical communication signal. This phase modulated optical communication signal is transmitted into free space.

The method also comprises the steps of amplifying a broad band frequency division multiplexed signal after passing through the optical heterodyne receiver. The balance of the signal which has not been split off for on-board satellite processing can be mixed with a predetermined frequency to form a desired frequency. The desired frequency formed for mixing the balance of the signal with a predetermined frequency can also be passed through a band pass filter. The amplifying step can include the step of amplifying this desired frequency with a predetermined frequency by amplifying only based on the signal strength, such as through an automatic gain control unit. A signal can also be mixed from on-board sources of the satellite with a predetermined frequency to form a desired frequency. The desired frequency formed from mixing the on-board sources of the satellite with a predetermined frequency can be passed through a band pass filter.

An apparatus, such as a desired optical non-processing transponder used in a repeater type satellite, comprises an optical heterodyne receiver that receives a phase modulated optical communication signal and produces a broad band frequency division multiplexed communication signal. A signal splitter is used for splitting off a part of the signal for on-board satellite processing. A power combiner combines the balance of the signal with a radio frequency signal from an on-board source of the satellite to form a combined broad band frequency division multiplexed communication signal. An electro-optic phase modulator phase modulates an optical carrier signal with the broad band frequency division multiplexed signal and an optical carrier pointing unit transmits the phase modulated carrier signal to a desired location.

The method also comprises the steps of transmitting the phase modulated optical communication signal to a receiver, such as part of a third satellite. This phase modulated optical communication signal is demodulated back into a broad band frequency division multiplexed signal. The signal is then demultiplexed into a plurality of analog communication signals. The method also comprises the steps of frequency division multiplexing a plurality of communication signals into a single broad band frequency division multiplexed communication signal. The method also comprises the steps of generating a plurality of digital communication signals and modulating the digital communication signals before frequency division multiplexing. The method also comprises the steps of up converting each of a plurality of analog communication signals into a defined frequency slot and combining the frequencies to create the frequency division multiplexed communication signal.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

The present invention is advantageous because it now allows a method and apparatus of free space satellite communications, where a satellite not only can repeat a signal between respective satellites, but also split off part of a signal for on-board satellite processing and combine the balance of the signal in a power combiner with a radio frequency signal from an on-board source of the satellite. This is advantageous because the satellite acting as a satellite signal repeater could have another optical transponder, or standard RF transponder, or could include an on-board processor for processing part of the signal. Additionally, signals from on-board satellite sources, such as a video signal from a telescope could be mixed and added with the balance of the signal and then phase modulated and transmitted to another satellite.

Figure 1:
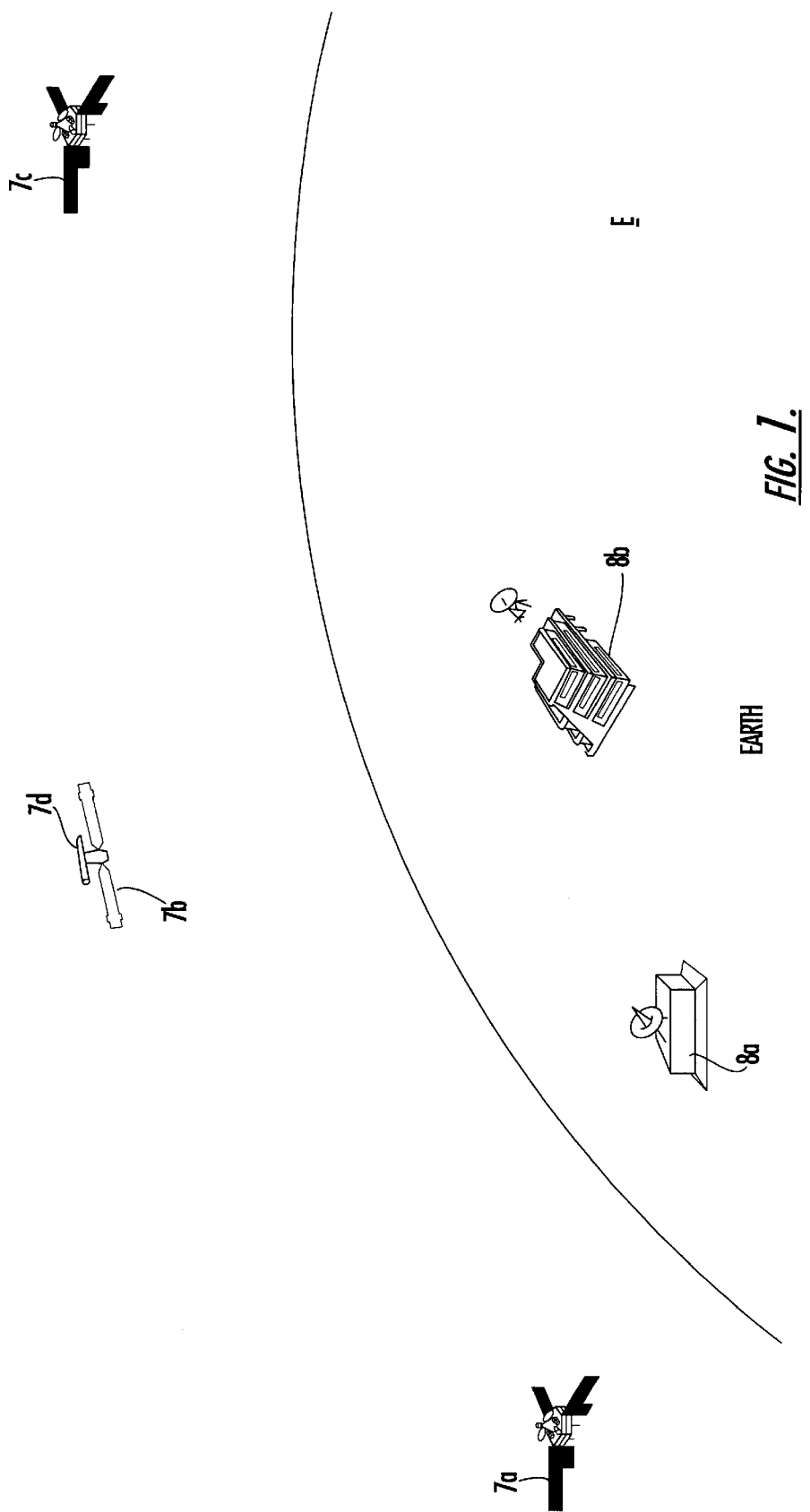
FIG. 1 is a schematic illustration of three satellites, one representing a repeater satellite having an optical non-processing transponder, which allows a signal from a first satellite to be repeated for transmission to a third satellite.
Figure 2A:
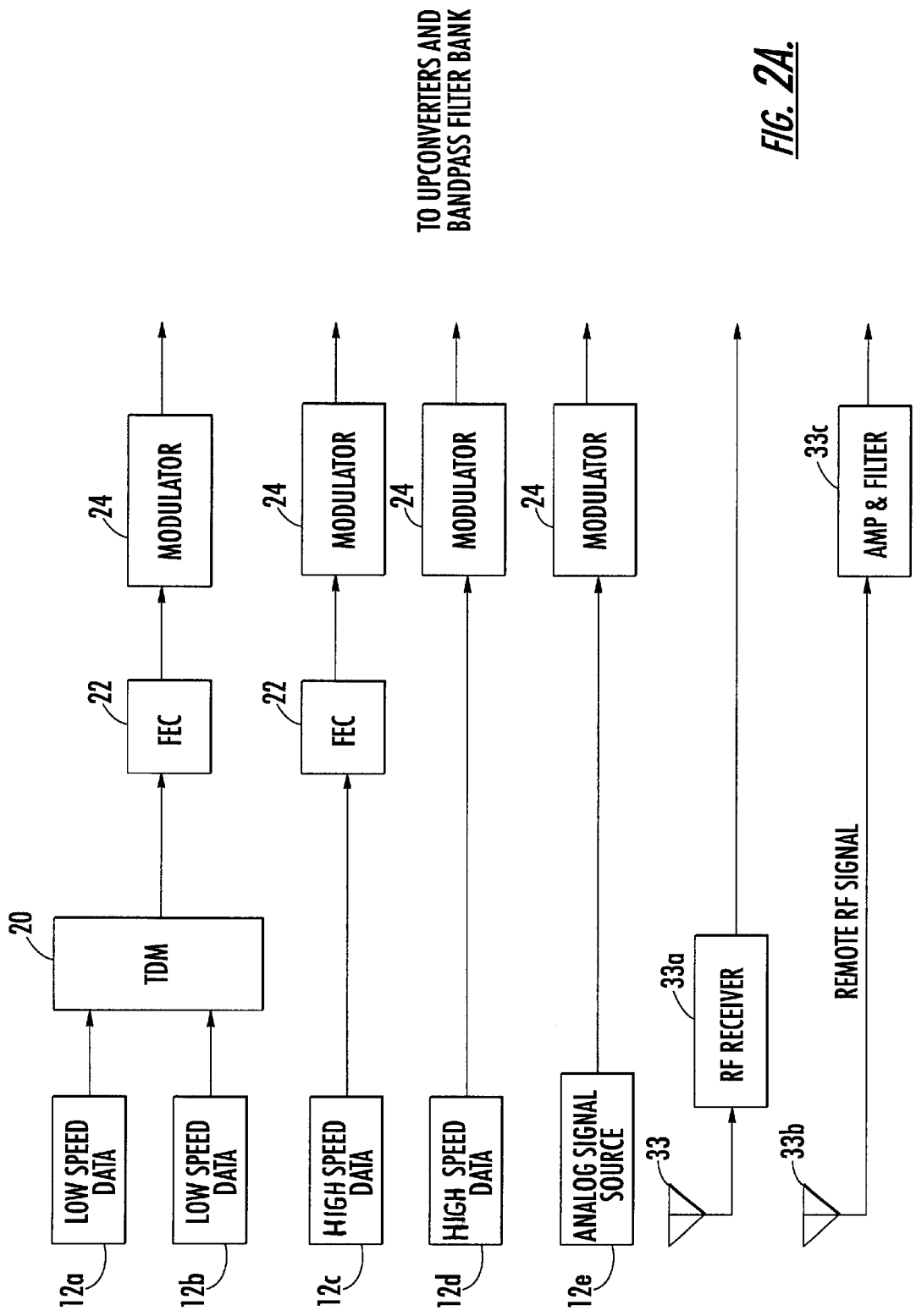
FIG. 2A is a schematic block diagram of the first half of a system that allows free space communication and showing band limited signal sources that are later combined.
Figure 2B:
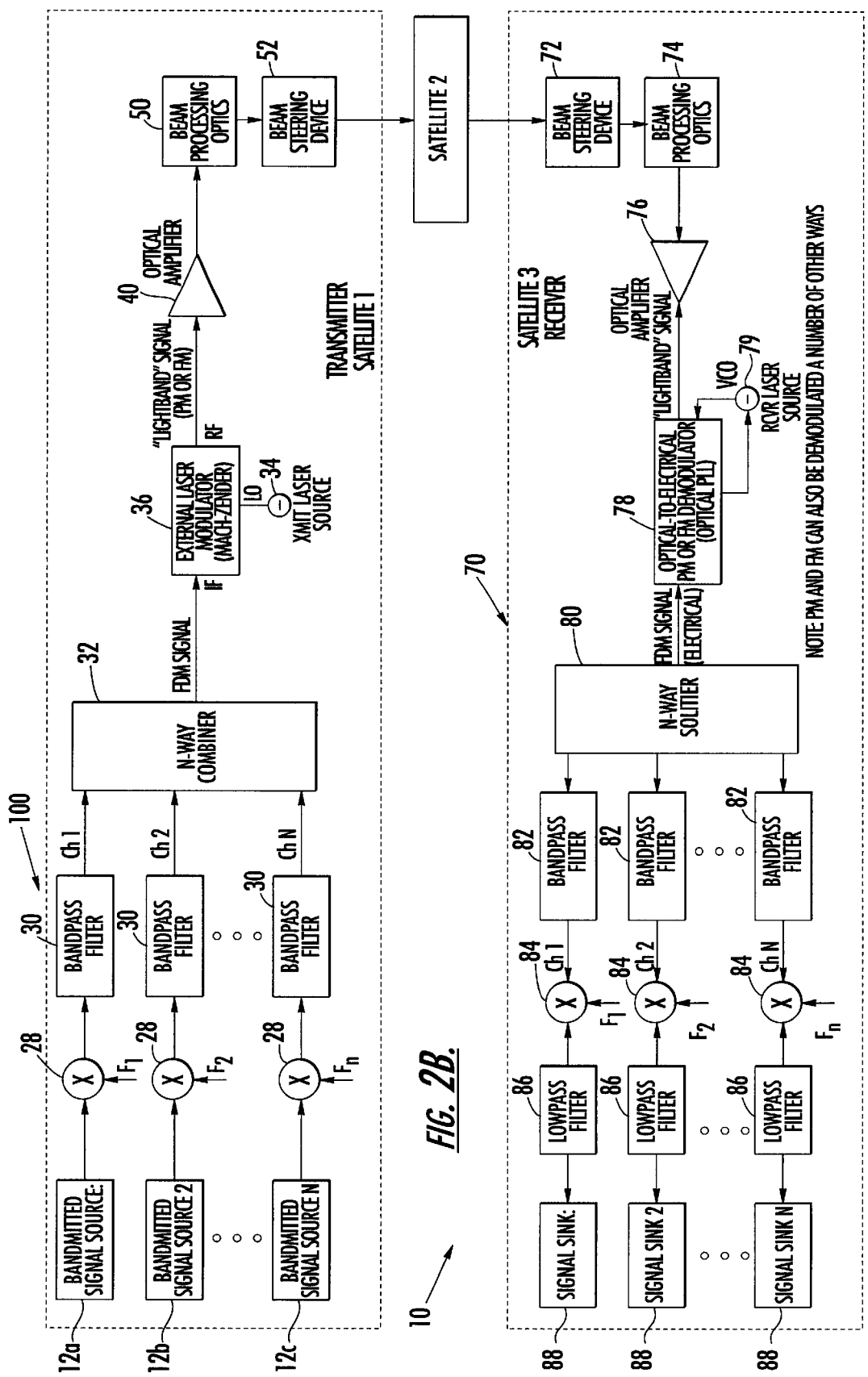
FIG. 2B is a schematic block diagram of a system of free space communications and showing the frequency division multiplexer and laser that generates an optical carrier signal and beam steering devices.

For purposes of description, the basic method and system of communicating in free space with an optical carrier signal that is phase modulated is first described with respect to the first and third satellites of FIG. 1. The first, second and third satellites 7a, 7b and 7c are orbiting the Earth (E). Signals are generated by Earth stations 8a, 8b and transmitted to the first satellite 7a, which processes the signals (FIGS. 2A, 2B) and transmits to the second satellite 7b, which retransmits as a repeater to the third satellite 7c. As shown in FIGS. 2A and 2B, a transmitter unit could be part of a ground station or placed in the first satellite and a receiver portion is positioned in the third satellite. Naturally, the satellites have both transmit and receive capability. The second satellite acts as a repeater and an optical non-processing transponder of the present invention.

Referring now to FIGS. 2A and 2B, there is illustrated at 10 a system that processes both digital and analog communication signals within a frequency division multiplexer and modulation unit indicated by the dotted line configuration at 10a.

For purposes of illustration, various examples of band limited signal sources are illustrated. Four digital data sources, an analog signal source, an RF receiver that receives analog signals and a remote amplifier and filter that receives other analog signals.

The sources of digital communication data 12a–d form an overall source or means for generating a plurality of digital communication signals. As illustrated, two of the data sources 12a and 12b are low speed data sources and communicate to a time division multiplexer 20 that receives the plurality of digital communication signals and multiplexes the digital communication signals into a plurality of time division multiplexed data streams. In the illustrated example, the two sources 12a and 12b can include many other sources (not illustrated) that are time division multiplexed. The digital data signals that are multiplexed are illustrated as low speed digital data channels (LSDC) and combined into moderate data rate time division multiplexed data streams.

For purposes of illustration, the process of frequency division multiplexing will be described relative to the low speed data sources 12a and 12b. The time division multiplexed data streams are then independently encoded using forward error correction (FEC) 22 and then pass through respective digital modulators 24 to produce a wave form of an analog signal as known to those skilled in the art. The modulated signals then enter the frequency division multiplexer (FIG. 2B), which includes respective mixers 28 that up converts each analog communication signal into a respective frequency slot or channel (shown as channels 1, 2 . . . N) at a typically higher frequency. This is accomplished through respective coding input to the mixers as illustrated by coding input lines indicated at $F_1$ through $F_m$. Those up converted frequencies then pass through a bank of band pass filters 30, and then into an N-way combiner 32 where the signals are combined into the frequency division multiplexed signal.

Depending on one skilled in the art, modulation choices can be selected depending on the design preferences. It is possible to have different codings, including concatenated codes and interweaving. A convolution code and a standard Reed-Solomon code could also be used adequately in the present invention for FEC. Any higher speed base band digital data channels (HSDC), such as from sources 12c and 12d, do not pass into the time division multiplexer because of impacts on spacecraft prime power and hardware overhead. Thus, these signals pass through the forward error correction 22 and are digitally modulated by modulators 24.

Analog signal source 12c passes through modulator 24, but not forward error correction. Other analog wave forms, such as received on an uplink, but not demodulated on-board, or other frequencies are multiplexed without passing through any forward error correction and modulators. These signals can be received in an antenna 33 of an RF receiver 33a, or pass into an antenna 33b and pass as a remote RF signal to an amplifier and filter 33c. All communication signals are subject to multiplexing as described before to produce a broad band frequency division multiplexed signal. The steps of multiplexing includes up converting each signal to a desired, unique frequency, then band pass filtering those up converted frequencies and combining the total up converted frequencies into a broad band frequency division multiplexed signal. The frequency division multiplexer can be made flexible by introducing dynamic channel and bandwidth allocations so that a laser producing the optical carrier signal will have a bandwidth that can be allocated "on-demand" by programming local oscillators and filters (not shown).

As shown in FIG. 2B, a transmit laser 34 generates an optical carrier signal. An electro-optic modulator 36 receives the broad band frequency division multiplexed signal and the laser generated optical carrier signal and phase modulates the optical carrier signal with the multiplexed signal to produce a phase modulated optical communication signal. As known to those skilled in the art in phase modulation, the instantaneous phase of the optical carrier signal is shifted in accordance with the modulating signal. In phase modulation, the extent of the phase shift is directly proportional to the amplitude of the modulating signal. The rapidity of the phase shift is directly proportional to both the amplitude and the frequency of the modulating signal, thus distinguishing phase modulation from frequency modulation where the result is a difference in the frequency-response characteristics.

The electro-optic modulator 36 of the present invention can comprise a Mach-Zender electro-optic modulator. This final up-conversion to "light band" as described is performed using the external analog modulation and power amplification techniques similarly used with continuous wave outputs of microwave transmissions. External modulation of the laser allows much wider modulation bandwidths than with direct laser diode modulation. Further, external modulation allows the laser diode to be selected without regard to the required modulation bandwidth using a Mach-Zender modulator and allow a very wide bandwidth (20 GHz). The laser requires low power and the Mach-Zender modulator can also implement frequency modulation besides the desired phase modulation.

After phase modulation, the phase modulated optical communication signal can pass through a sideband filter and then into erbium-doped fiber amplifier 40. The desired optical carrier signal produced by the laser 34 is about 1,550 nm to allow amplification of the phase modulated optical communication signal with erbium-doped fiber amplifiers.

Figure 5:
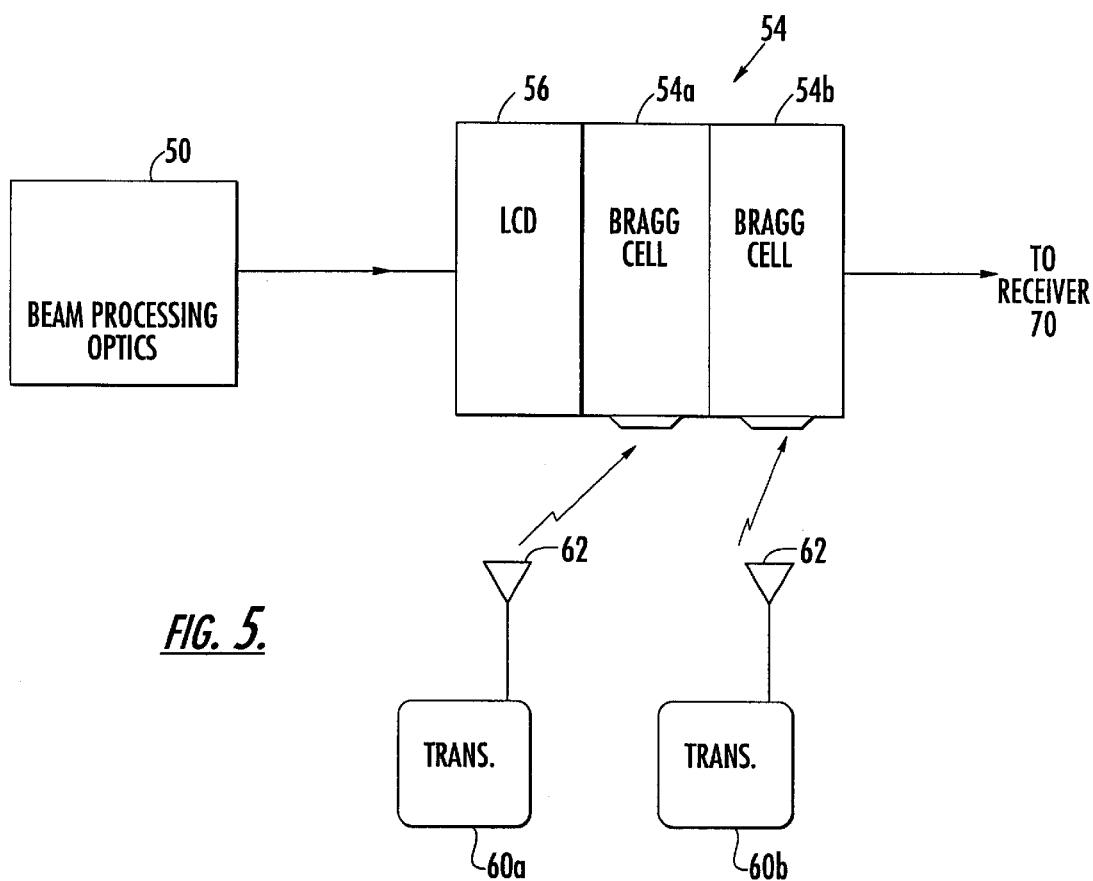
FIG. 5 is a schematic block diagram of a non-mechanical steering device having a liquid crystal display and first and second Bragg cell elements.

The amplified signal then passes into beam processing optics 50 and through a beam steering device 52 of the present invention. As illustrated in FIG. 5, the beam steering device 52 includes a Bragg cell 54 formed from first and second Bragg cell elements 54a, 54b that provide for two-dimensional "coarse" steering or indexing followed by a liquid crystal display 56 that allows for fine indexing or steering of the phase modulated optical communication signal. The first and second Bragg cell elements 54b are connected to respective radio frequency sources that are highly stable, spectrally pure, local oscillators that are used for steering the optical communication signal from a ground station or via satellite.

Figure 3:
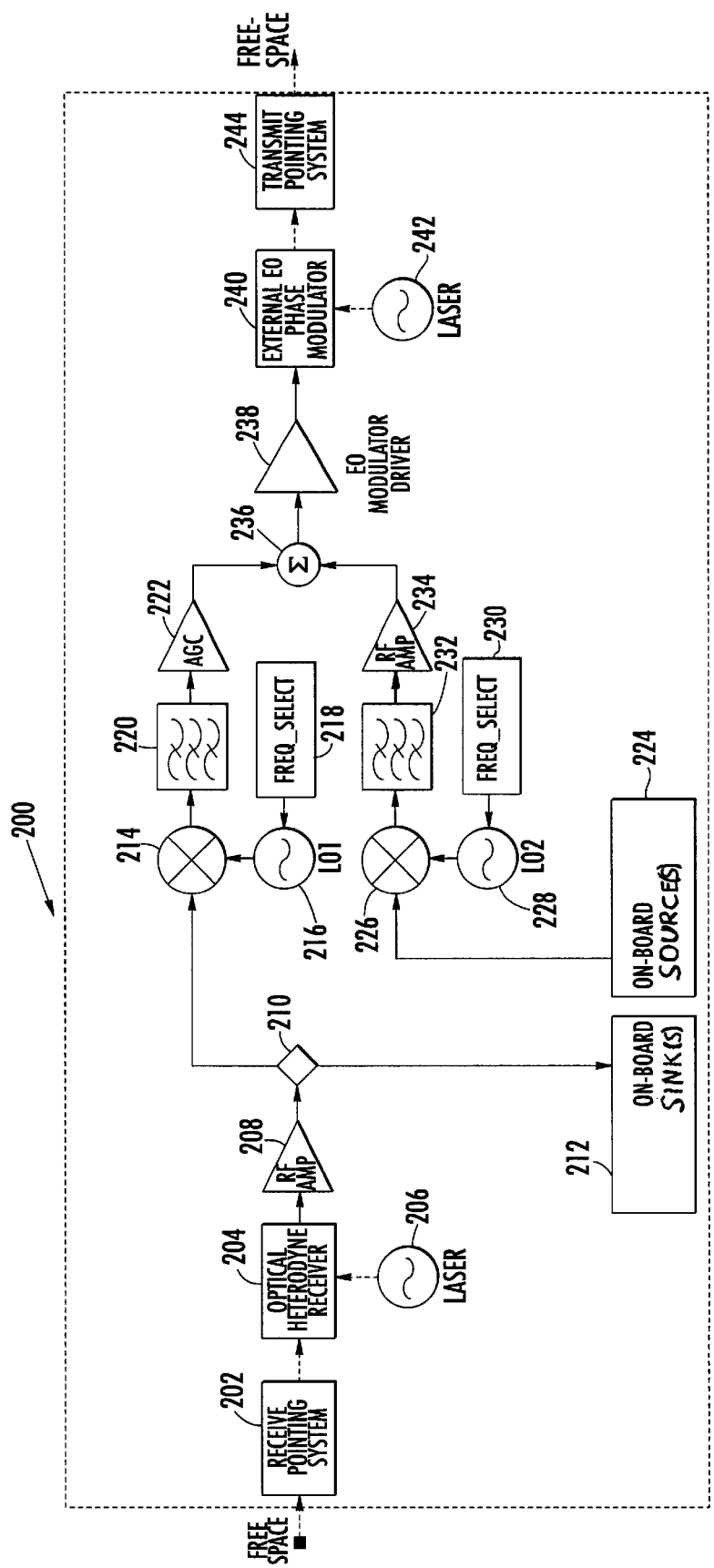
FIG. 3 is a schematic block diagram of the apparatus that is used as an optical non-processing transponder in accordance with the present invention and used as a repeater in the second satellite of FIG. 1.

The second satellite (7b of FIG. 1) includes an optical non-processing transponder, illustrated in greater detail in the block diagram of FIG. 3. It is clear from FIG. 3 that a phase modulated optical communication signal is received from the first satellite or ground station within the second satellite. Naturally, this phase modulated optical communication system is formed by phase modulating the optical carrier signal with the broad band frequency division multiplexed communication signal as described before. For purposes of description, the components shown in FIG. 3 will be described with reference to numerals beginning in the 200 series.

The second satellite includes an optical non-processing transponder, indicated generally at 200. A receive pointing unit 202 includes the necessary mechanical or non-mechanical components to receive the optical carrier signal. This signal is then passed through an optical heterodyne receiver 204 that includes a laser source 206 to produce a broad band frequency division multiplexed communication signal. This signal is then amplified within the RF amplifier 208. In the illustrated embodiment of FIG. 3, a part of the signal is split off by a splitter 210 for on-board satellite processing in on-board sinks 212. These sinks could be any number of different items, including a radio frequency transmitter, another optical transponder, and on-board processors for processing the signal and any other information within the signal that has been split off.

Part of the signal that has not been split off is then passed through a mixer 214 where a local oscillator 216 has generated a preselected frequency via a frequency selector circuit 218. This selected frequency is mixed with that part of the signal that has not been split off. At this time, the desired frequency is formed, which then passes through a band pass filter 220 that filters at undesired upper and lower frequencies. The signal then passes through an automatic gain control unit 222 that acts as an amplifier. However, the amplification varies depending on the signal strength.

At the same time, other signals from on-board sources 224 can be received within a mixer 226 which mixes the signals from on-board sources 224 with a predetermined frequency as generated by a second local oscillator 228 having a frequency selector circuit 230. These on-board satellite sources 224 could include any number of different data and signal sources, such as video data received from an on-board telescope 7d, as shown in FIG. 1. The mixer 226 then outputs the desired second frequency, which passes through a band pass filter 232 and radio frequency amplifier 234.

A power combiner 236, i.e., a summer, combines the two output frequencies from the AGC 222 and RF AMP 234 into one frequency, which then passes through an electro-optic modulator driver 238 and then into an external electro-optic phase modulator 240. A laser 242 generates an optical carrier signal of the type noted before with reference to FIGS. 2A and 2B. The combined signal from the power divider 236 and driver 238 modulates the carrier signal. The signal then passes through a transmit and pointing unit 244, using either mechanical or non-mechanical means, and then into free space where it is transmitted to the third satellite 7c, having a receiver to receive the phase modulated optical communication signal.

As illustrated, a receiver unit 70 can be positioned in a satellite to receive the phase modulated optical communication signal. The receiver 70 includes a beam steering device 72 having a structure similar as in beam steering device 52. Beam steering device 72 receives the signal and then passes the signal to beam processing optics 74 and optical amplifier 76. The signal passes to an optical-to-electrical PM or FM demodulator 78 (i.e., optical phase locked loop demodulator) that receives VCO from receiver laser source 79. The signal passes to N-way splitter 80. The individual channels from the N-way splitter that correspond to each signal pass through band pass filters 82 and respective mixers 84 that are subject to coded sequences $F_1$ through $F_M$. The individual signals after demixing pass through low pass filter 86 and form the signal sinks 1-N 88 as illustrated. Because phase locked loop detection can be used, the Doppler shift induced by the relative motion of two communication platforms, such as in intersatellite communication systems, can be compensated.

After phase locked loop demodulation, as described above, the broad band frequency division multiplexed signal passes through the N-way splitter 80 where the various channels are separated in the basic reverse sequences of steps as described in the modulating and frequency multiplexing steps. The individual receiver would also maintain the bit and frame synchronization for proper decoding of the data streams. Naturally, appropriate circuitry can act as a digital demodulator for producing original digital data streams.

Figure 4:
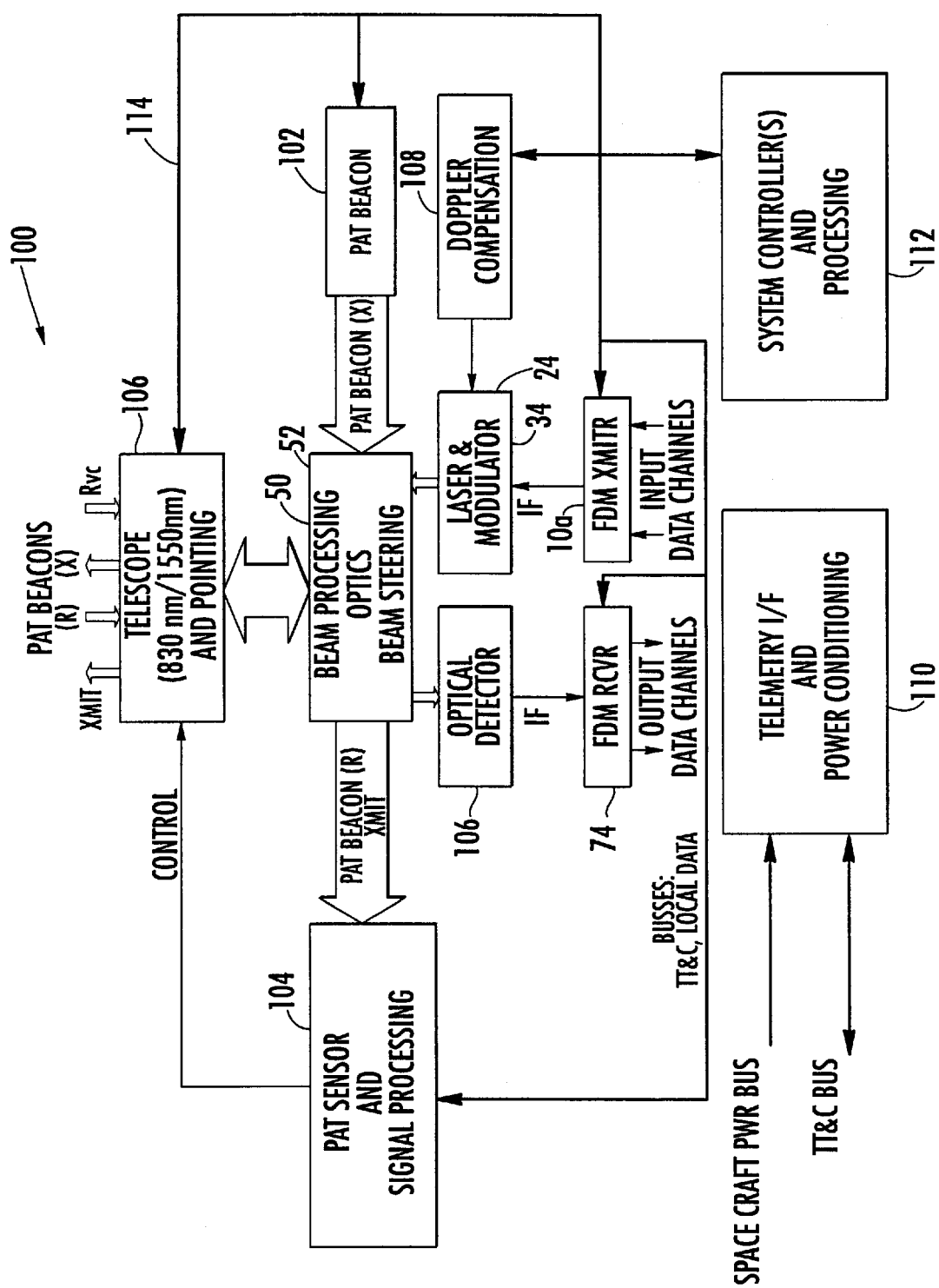
FIG. 4 is an overall schematic block diagram of functional elements used in the communication system as described herein.

FIG. 4 illustrates a high level block diagram of a laser communications terminal indicated at 100, which can be used such as in the satellites. As noted, the optical carriers are generated by the laser for transmit and receive laser beams in the 1,550 nm band and offset by several nm to ease optical filtering. Point and tracking (PAT) beacons 102 for the laser 34 can use wavelengths less than one micrometer. All optical signals are envisioned to share the same telescope optics. The interfaces to the optical modulator and detector portions of the overall terminal are designed to mimic a typical microwave transmitter. Therefore, microwave links can be upgraded transparently. The laser beam 34 is typically a semiconductor laser diode and chosen for wavelength considerations. The beam processing optics is a collection of filters, splitter/combiners, lenses and collimators that are used to deliver coherent beams to proper destinations as known to those skilled in the art.

The point and tracking sensor and signal processing circuit 104 are used for the initial acquisition and, if necessary, reacquisition in tracking of various transmit and receive laser beams for communication with another satellite or spacecraft. Special telescope pointing tracking beacon circuits 106 are used for optically establishing and maintaining optical alignment between two satellites or platforms. The non-mechanical steering device 52 of the present invention is used to mimic the usual mechanical devices found in some steering assemblies. The Bragg cell can also provide for beam spoiling where the beam divergence is intentionally increased to search the entire field of uncertainty (FOU) for a receiver located on another satellite. The usual approach is to perform a spiral scan of the field of uncertainty, which is time consuming and necessitates spacecraft attitude compensation.

The optical method as described requires no compensation and the optical approach using the liquid crystal display and Bragg cell decreases the payload weight, requires less fuel, and dramatically decreases acquisition times. It also provides higher bandwidth controls to maintain pointing, which reduces burst errors. Other circuits that are known to those skilled in the art are the optical detector circuit 106, the frequency division multiplexer transmitter 10a, the receiver 70 having the frequency division demultiplexer, the telemetry I/F and power conditioning circuit 110, and the system controllers and processing circuits 112. An appropriate circuit bus 114 interconnects the various circuits.

The point-ahead angle for the laser beam can be calculated using a fast read-out focal plane CCD array and a two spot system. The point-ahead angle can be derived by computing the Euclidean distance between the centroids of a receive beacon and transmit signal. The data can be processed using a specialized read-out algorithm and dedicated digital signal processing hardware.

It is evident that the present invention is advantageous because it allows signal repeating of both data and analog communication signals that are transmitted on an optical carrier signal through phase modulation. Not only can the optical signal be repeated, but also portions of an optical signal can be split off to on-board sinks, and also other signals from on-board sources can be combined with the balance of the signal that was not split off to form part of the retransmitted optical signal.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that the modifications and embodiments are intended to be included within the scope of the dependent claims.

That which is claimed is:

1. A method of free space satellite communications comprising the steps of:
   receiving a phase modulated optical communications signal within a satellite, wherein the phase modulated optical communication signal has been formed by phase modulating an optical carrier signal with a broad band frequency division multiplexed communication signal;
   passing the signal through an optical heterodyne receiver to produce a broad band frequency division multiplexed communication signal;
   splitting off a part of the signal for on-board satellite processing;
   combining in a power combiner the balance of the signal with a radio frequency signal from an on-board source of the satellite to form a combined broad band frequency division multiplexed communication signal;
   phase modulating an optical carrier signal with the broad band frequency division multiplexed signal by mixing the multiplexed signal with the optical carrier signal in an electro-optic modulator to produce a phase modulated optical communications signal; and
   transmitting the phase modulated optical communications signal into free space.

2. A method according to claim 1, and further comprising the steps of amplifying the broad band frequency division multiplexed communication signal after passing through the optical heterodyne receiver.

3. A method according to claim 1, and further comprising the steps of mixing the balance of the signal which has not been split off for on-board satellite processing with a predetermined frequency to form a desired frequency.

4. A method according to claim 3, and further comprising the step of passing the desired frequency formed from mixing the balance of the signal with a predetermined frequency through a bandpass filter.

5. A method according to claim 3, and further comprising the step of amplifying the desired frequency formed from mixing the balance of the signal with a predetermined frequency, wherein the amplifying varies depending on the signal strength.

6. A method according to claim 1, and further comprising the steps of mixing a signal from on-board sources of the satellite with a predetermined frequency to form a desired frequency.

7. A method according to claim 6, and further comprising the steps of passing the desired frequency formed from mixing the on-board sources of the satellite with a predetermined frequency though a bandpass filter.

8. A method according to claim 6, and further comprising the steps of amplifying the signal formed from mixing the on board-sources of the satellite with a predetermined frequency.

9. A method according to claim 1, and further comprising the steps of transmitting the phase modulated optical communications signal to a receiver;
   demodulating the phase modulated optical communications signal back into a broad band frequency division multiplexed signal; and
   demultiplexing the broad band frequency division multiplexed signal into the plurality of analog communication signals.

10. A method according to claim 1, and further comprising the steps of frequency division multiplexing a plurality of communication signals into a single broad band frequency division multiplexed communication signal.

11. A method according to claim 10, and further comprising the steps of generating a plurality of digital communication signals and modulating the digital communication signals into digital waveform communication signals before frequency division multiplexing.

12. A method according to claim 1, and further comprising the steps of up converting each of a plurality of analog communication signals into a defined frequency slot, and combining the frequencies to create the frequency division multiplexed communication signal.

13. A method of free space communication comprising the steps of:
   receiving a phase modulated optical communications signal within a satellite, wherein the phase modulated optical communication signal has been formed by phase modulating an optical carrier signal with a broad band frequency division multiplexed communication signal;
   passing the signal through an optical heterodyne receiver to produce the broad band frequency division multiplexed communication signal;
   combining in a power combiner the balance of the communication signal with a radio frequency signal from an on-board source of the satellite to form a combined broad band frequency division multiplexed communication signal;
   phase modulating an optical carrier signal with the broad band frequency division multiplexed signal by mixing the multiplexed signal with the optical carrier signal in an electro-optic modulator to produce a phase modulated optical communications signal; and
   transmitting the phase modulated optical communications signal into free space.

14. A method according to claim 13, and further comprising the steps of amplifying the broad band frequency division multiplexed communication signal after passing through the optical heterodyne receiver.

15. A method according to claim 13, and further comprising the steps of splitting off a part of the signal for on-board satellite processing and mixing the balance of the signal which has not been split off for on-board satellite processing with a predetermined frequency to form a desired frequency.

16. A method according to claim 15, and further comprising the step of passing the desired frequency formed from mixing the balance of the signal with a predetermined frequency through a bandpass filter.

17. A method according to claim 15, and further comprising the step of amplifying the desired frequency formed from mixing the balance of the signal with a predetermined frequency, wherein the amplifying varies depending on the signal strength.

18. A method according to claim 13, and further comprising the steps of mixing a signal from on-board sources of the satellite with a predetermined frequency to form a desired frequency.

19. A method according to claim 18, and further comprising the steps of passing the desired frequency formed from mixing the on-board sources of the satellite with a predetermined frequency though a bandpass filter.

20. A method according to claim 18, and further comprising the steps of amplifying the signal formed from mixing the on board-sources of the satellite with a predetermined frequency.

21. A method according to claim 13, and further comprising the steps of transmitting the phase modulated optical communications signal to a receiver;
   demodulating the phase modulated optical communications signal back into a broad band frequency division multiplexed signal; and
   demultiplexing the broad band frequency division multiplexed signal into the plurality of analog communication signals.

22. A method according to claim 13, and further comprising the steps of frequency division multiplexing a plurality of communication signals into a single broad band frequency division multiplexed signal.

23. A method according to claim 22, and further comprising the steps of generating a plurality of digital communication signals and modulating the digital communication signals into digital waveform communication signals before frequency division multiplexing.

24. A method according to claim 13, and further comprising the steps of up converting each of a plurality of analog communication signals into a defined frequency slot, and combining the frequencies to create the frequency division multiplexed signal.

25. A method of free space communication comprising the steps of:
   receiving a phase modulated optical communications signal within a satellite, wherein the phase modulated optical communication signal has been formed by phase modulating an optical carrier signal with a broad band frequency division multiplexed communication signal;
   passing the signal through an optical heterodyne receiver to produce the broad band frequency division multiplexed communication signal;
   phase modulating an optical carrier signal with the broad band frequency division multiplexed signal by mixing the multiplexed signal with the optical carrier signal in an electro-optic modulator to produce a phase modulated optical communications signal; and
   transmitting the phase modulated optical communications signal into free space.

26. A method according to claim 25, and further comprising the steps of amplifying the broad band frequency division multiplexed communication signal after passing through the optical heterodyne receiver.

27. A method according to claim 25, and further comprising the steps of transmitting the phase modulated optical communications signal to a receiver;
   demodulating the phase modulated optical communications signal back into a broad band frequency division multiplexed signal; and
   demultiplexing the broad band frequency division multiplexed signal into the plurality of analog communication signals.

28. A method according to claim 25, and further comprising the steps of frequency division multiplexing a plurality of communication signals into a single broad band frequency division multiplexed signal.

29. A method according to claim 28, and further comprising the steps of generating a plurality of digital communication signals and modulating the digital communication signals into digital waveform communication signals before frequency division multiplexing.

30. A method according to claim 25, and further comprising the steps of up converting each of a plurality of analog communication signals into a defined frequency slot, and combining the frequencies to create the frequency division multiplexed signal.

31. An apparatus for satellite communications comprising:
   an optical heterodyne receiver that receives a phase modulated optical communications signal and produces a broad band frequency division multiplexed communication signal;
   a signal splitter for splitting off a part of the signal for on-board satellite processing;
   a power combiner for combining the balance of the signal with a radio frequency signal from an on-board source of the satellite to form a combined broad band frequency division multiplexed communication signal;
   an electro-optic phase modulator for phase modulating an optical carrier signal with the broad band frequency division multiplexed signal; and
   a optical carrier pointing unit for transmitting the phase modulated carrier signal to a desired location.

32. An apparatus according to claim 31, and further comprising a signal amplifier for amplifying the broad band frequency division multiplexed communication signal after passing through the optical heterodyne receiver.

33. An apparatus according to claim 31, and further comprising a mixer for mixing the balance of the signal which has not been split off for on-board processing with a predetermined frequency to form a desired frequency.

34. An apparatus according to claim 33, and further comprising a bandpass filter through which the signal is passed.

35. An apparatus according to claim 33, and further comprising an amplifier for amplifying the desired frequency formed from mixing the balance of the signal with a predetermined frequency, wherein the amplifying varies depending on the signal strength.

36. An apparatus according to claim 31, and further comprising a mixer that mixes the signal from on-board sources of the satellite with a predetermined frequency to form a desired frequency.

37. An apparatus to claim 36, and further comprising a bandpass filter through which the desired frequency formed from mixing the on-board sources of the satellite with a predetermined frequency is passed.

38. An apparatus for satellite communications comprising:
   an optical heterodyne receiver that receives a phase modulated optical communications signal and produces a broad band frequency division multiplexed communication signal;
   a power combiner for combining the communications signal with a radio frequency signal from an on-board source of a satellite to form a combined broad band frequency division multiplexed communication signal; and
   an electro-optic phase modulator for phase modulating an optical carrier signal with the broad band frequency division multiplexed signal; and a optical carrier pointing unit for transmitting the phase modulated carrier signal to a desired location.

39. An apparatus according to claim 38, and further comprising a signal amplifier for amplifying the broad band frequency division multiplexed communication signal after passing through the optical heterodyne receiver.

40. An apparatus according to claim 38, and further comprising a bandpass filter through which the communications signal is passed.

41. An apparatus according to claim 38, and further comprising a mixer that mixes the signal from on-board sources of the satellite with a predetermined frequency to form a desired frequency.

42. An apparatus to claim 41, and further comprising a bandpass filter through which the desired frequency formed from mixing the on-board sources of the satellite with a predetermined frequency is passed.

43. An apparatus for satellite communications comprising:
- an optical heterodyne receiver that receives a phase modulated optical communications signal and produces a broad band frequency division multiplexed communication signal;
- an electro-optic phase modulator for phase modulating an optical carrier signal with the broad band frequency division multiplexed signal; and
- a optical carrier pointing unit for transmitting the phase modulated carrier signal to a desired location.

\* \* \* \* \*